US010502423B2

(12) United States Patent
Gao et al.

(10) Patent No.: US 10,502,423 B2
(45) Date of Patent: Dec. 10, 2019

(54) SEQUENTIAL COMBUSTION WITH DILUTION GAS

(71) Applicant: ALSTOM TECHNOLOGY LTD, Baden (CH)

(72) Inventors: Xianfeng Gao, Niederrohrdorf (CH); Luis Tay Wo Chong Hilares, Neuenhof (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 631 days.

(21) Appl. No.: 14/918,787

(22) Filed: Oct. 21, 2015

(65) Prior Publication Data
US 2016/0040885 A1 Feb. 11, 2016

Related U.S. Application Data

(63) Continuation of application No. PCT/EP2014/054355, filed on Mar. 6, 2014.

(51) Int. Cl.
*F23R 3/06* (2006.01)
*F02C 6/02* (2006.01)
(Continued)

(52) U.S. Cl.
CPC .............. *F23R 3/06* (2013.01); *F02C 6/02* (2013.01); *F23M 20/005* (2015.01); *F23R 3/002* (2013.01);
(Continued)

(58) Field of Classification Search
CPC .... F23R 3/06; F23R 3/002; F23R 3/34; F23R 3/346; F23R 3/045; F23R 3/08;
(Continued)

(56) References Cited

U.S. PATENT DOCUMENTS 4,301,657 A 11/1981 Penny
4,475,344 A 10/1984 Mumford et al.
(Continued)

FOREIGN PATENT DOCUMENTS

DE 103 12 971 A1 12/2004
DE 10 2011 012 414 A1 8/2012
(Continued)

OTHER PUBLICATIONS

International Search Report (PCT/ISA/210) dated Oct. 6, 2014, by the European Patent Office as the International Searching Authority for International Application No. PCT/EP2014/054355.
(Continued)

*Primary Examiner* — Andrew H Nguyen
(74) *Attorney, Agent, or Firm* — Buchanan Ingersoll & Rooney PC

(57) ABSTRACT

An exemplary sequential combustor arrangement includes a first burner, a first combustion chamber, a mixer for admixing a dilution gas to the hot gases leaving the first combustion chamber during operation, a second burner, and a second combustion chamber arranged sequentially in a fluid flow connection. The mixer includes at least three groups of injection tubes pointing inwards from the side walls of the mixer for admixing the dilution gas to cool the hot flue gases leaving the first combustion chamber. The first injection tubes of the first group have a first protrusion depth, the second injection tubes of the second group have a protrusion depth, and the third injection tubes of the third group have a third protrusion depth.

19 Claims, 4 Drawing Sheets

(51) Int. Cl.
  *F23R 3/00* (2006.01)
  *F23M 20/00* (2014.01)
(52) U.S. Cl.
  CPC ...... *F05D 2220/32* (2013.01); *F05D 2240/35* (2013.01); *F05D 2260/964* (2013.01); *F23R 2900/00014* (2013.01); *F23R 2900/03341* (2013.01); *Y02E 20/16* (2013.01)
(58) Field of Classification Search
  CPC .. F23R 2900/03341; F23R 2900/03041; F23R 2900/00014
  See application file for complete search history.

(56) References Cited

U.S. PATENT DOCUMENTS

| | | | |
|---|---|---|---|
| 5,431,018 | A | 7/1995 | Keller |
| 6,145,319 | A | 11/2000 | Burns et al. |
| 6,205,789 | B1 * | 3/2001 | Patterson ............... F23R 3/002 60/754 |
| 7,509,809 | B2 | 3/2009 | Patel et al. |
| 7,614,235 | B2 * | 11/2009 | Burd ............... F23R 3/002 60/752 |
| 7,654,089 | B2 | 2/2010 | Schilling et al. |
| 2002/0005274 | A1 * | 1/2002 | Beeck ............... F01D 5/187 165/109.1 |
| 2002/0017101 | A1 | 2/2002 | Schilling et al. |
| 2005/0150232 | A1 * | 7/2005 | Dittmann ............... F01D 25/12 60/782 |
| 2006/0277921 | A1 | 12/2006 | Patel et al. |
| 2009/0084100 | A1 * | 4/2009 | Johnson ............... F23R 3/002 60/375 |
| 2009/0100840 | A1 * | 4/2009 | Campion ............... F23R 3/06 60/754 |
| 2010/0162712 | A1 * | 7/2010 | Zupanc ............... F23R 3/06 60/747 |
| 2010/0218503 | A1 | 9/2010 | Bronson et al. |
| 2010/0236245 | A1 | 9/2010 | Johnson et al. |
| 2012/0036859 | A1 | 2/2012 | Johnson et al. |
| 2014/0144145 | A1 | 5/2014 | Rachwitz et al. |

FOREIGN PATENT DOCUMENTS

| | | | |
|---|---|---|---|
| EP | 0 086 667 | A1 | 8/1983 |
| EP | 0 178 820 | A1 | 4/1986 |
| EP | 0 972 992 | A2 | 1/2000 |
| EP | 1 001 222 | A2 | 5/2000 |
| EP | 2 053 312 | A2 | 4/2009 |
| EP | 2 224 170 | A2 | 9/2010 |
| GB | 1196168 | * | 6/1970 ............... F23R 3/08 |

OTHER PUBLICATIONS

Written Opinion (PCT/ISA/237) dated Oct. 6, 2014, by the European Patent Office as the International Searching Authority for International Application No. PCT/EP2014/054355.

Communication pursuant to Article 94(3) EPC dated May 31, 2017, by the European Patent Office in corresponding European Patent Application No. 14 708 266.3-1605. (5 pages).

Office Action/Search Report dated Nov. 17, 2016, by the Chinese Patent Office in corresponding Chinese Patent Application No. 201480023116.5 and English translation of the Office Action/Search Report. (21 pages).

* cited by examiner

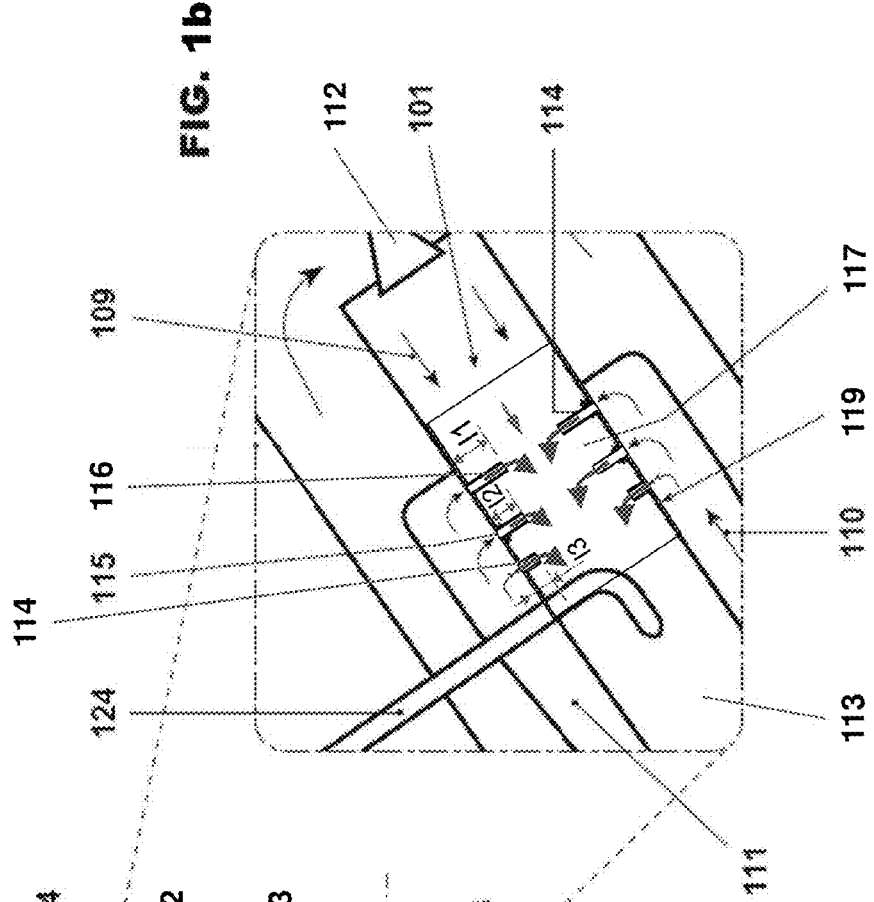
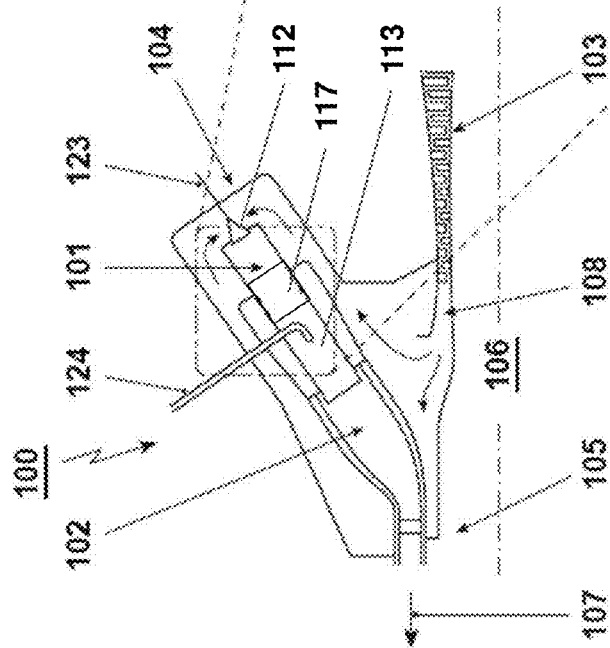

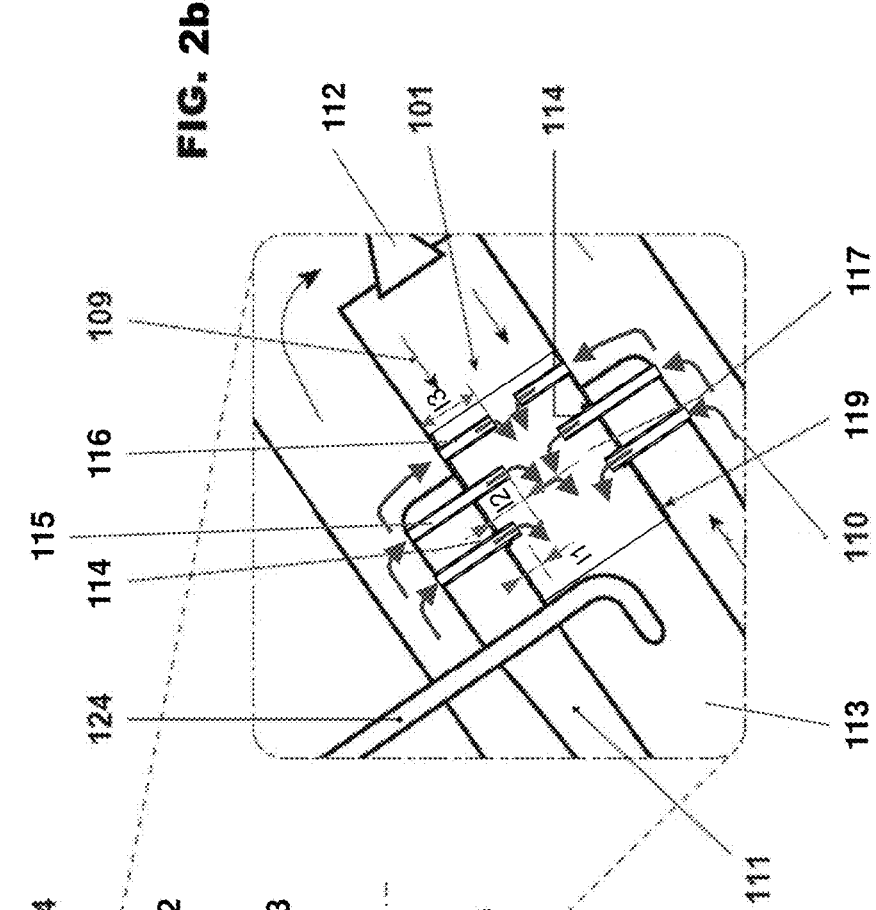
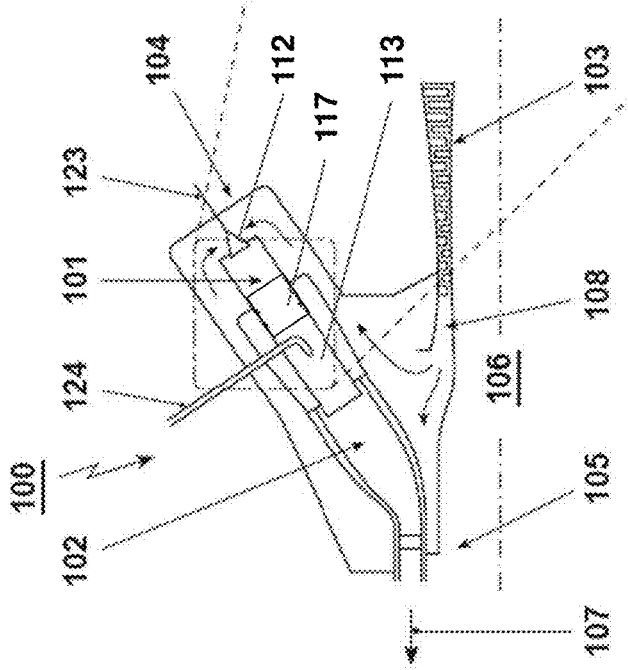

SEQUENTIAL COMBUSTION WITH DILUTION GAS

RELATED APPLICATION

This application claims priority as a continuation application under 35 U.S.C. § 120 to PCT/EP2014/054355, which was filed as an International application on Mar. 6, 2014 designating the U.S., and which claims priority to International Application PCT/EP2013/058650 filed in Europe on Apr. 25, 2013. The entirety of each prior application is hereby incorporated by reference.

FIELD

The present disclosure relates to a sequential combustor arrangement for a gas turbine with admixing dilution gas in the combustor arrangement, and to a method for operating a gas turbine with admixing dilution gas in a combustor arrangement.

BACKGROUND

Due to increased power generation by unsteady renewable sources like wind or solar existing gas turbine based power plants are increasingly used to balance power demand and to stabilize the grid. Thus improved operational flexibility is generally required. This requirement implies that gas turbines are often operated at lower load than the base load design point, e.g., at lower combustor inlet and firing temperatures.

At the same time, emission limit values and overall emission permits are becoming more stringent, so that it can be specified to operate at lower emission values, keep low emissions also at part load operation and during transients, as these also count for cumulative emission limits.

Known (e.g., state-of-the-art) combustion systems are designed to cope with a certain variability in operating conditions, e.g. by adjusting the compressor inlet mass flow or controlling the fuel split among different burners, fuel stages or combustors. However, this design is not sufficient to meet the new requirements.

To further reduce emissions and operational flexibility sequential combustion has been suggested in DE 10312971 A1. Depending on the operating conditions, for example on the hot gas temperature of a first combustion chamber it can be necessary to cool the hot gases before they are admitted to a second burner (also called sequential burner). This cooling can be advantageous to allow fuel injection and premixing of the injected fuel with the hot flue gases of the first combustor in the second burner.

Known cooling methods either specify heat exchanger structures which lead to high pressure drops in the main hog gas flow or suggest injection of a cooling medium from the side walls. For injection of a cooling medium from the side walls a high pressure drop can be specified which is detrimental to the efficiency of a gas turbine operated with such a combustor arrangement and a controlled cooling of the whole flow is difficult.

SUMMARY

An exemplary sequential combustor arrangement is disclosed comprising: a first burner, a first combustion chamber, a mixer for admixing a dilution gas to the hot gases leaving the first combustion chamber during operation, a second burner, and a second combustion chamber arranged sequentially in a fluid flow connection, wherein the mixer is adapted to guide combustion gases in a hot gas flow path extending between the first combustion chamber and the second burner including a duct having an inlet at an upstream end adapted for connection to the first combustion chamber and an outlet at a downstream end adapted for connection to the second burner, wherein the mixer includes at least three groups of injection tubes pointing inwards from the side walls of the mixer for admixing the dilution gas to cool hot flue gases leaving the first combustion chamber, wherein the injection tubes of each group are arranged circumferentially distributed along respective side walls of the mixer, and wherein first injection tubes of the first group have a first protrusion depth, second injection tubes of the second group have a second protrusion depth, and third injection tubes of the third group have a third protrusion depth.

An exemplary method is disclosed for operating a gas turbine with at least a compressor, a sequential combustor arrangement including a first burner, a first combustion chamber, a mixer, a second burner, and a second combustion chamber arranged sequentially in a fluid flow connection, wherein the mixer is adapted to guide combustion gases in a hot gas flow path extending between the first combustion chamber and the second burner including a duct having an inlet at an upstream end adapted for connection to the first combustion chamber and an outlet at a downstream end adapted for connection to the second burner, wherein the mixer includes at least three groups of injection tubes pointing inwards from the side walls of the mixer, wherein the injection tubes of each group are arranged circumferentially distributed along side walls of the mixer, wherein first injection tubes of the first group have a first protrusion depth, second injection tubes of the second group have a second protrusion depth, and third injection tubes of the third group have a third protrusion depth, the method comprising: guiding, in the mixer, combustion gases in a hot gas flow path extending between the first combustion chamber and the second burner; and admixing, in the mixer, a dilution gas to the hot gases leaving the first combustion chamber, wherein the dilution gases are admixed via the injection tubes of the mixer to cool hot flue gases leaving the first combustion chamber, and the dilution gases are admixed in different regions of a cross section of the mixer via the first, second, and third injection tubes.

BRIEF DESCRIPTION OF THE DRAWINGS

The disclosure, its nature as well as its advantages, shall be described in more detail below with the aid of the accompanying drawings. Referring to the drawings:

FIG. 1a, 2a show a generic gas turbine using sequential combustion with a mixer for admixing dilution gas in accordance with an exemplary embodiment of the present disclosure;

FIG. 1b shows an sequential combustor arrangement with a mixer with first, second, and third injection tubes in accordance with an exemplary embodiment of the present disclosure;

FIG. 2b shows a sequential combustor arrangement with a mixer with first, second, and third injection tubes in accordance with an exemplary embodiment of the present disclosure;

DETAILED DESCRIPTION

Figure 3:
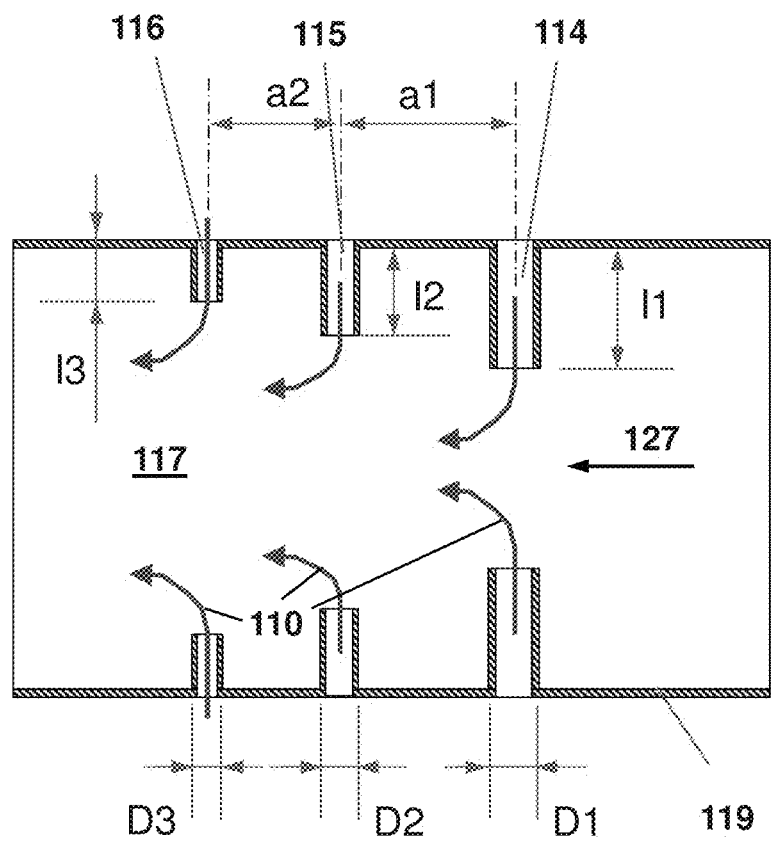
FIG. 3 shows a mixer section with first, second, and third injection tubes in accordance with an exemplary embodiment of the present disclosure.

Exemplary embodiments of the present disclosure provide a sequential combustor arrangement with a mixing section for dilution gas admixing between the first combustion chamber and the second burner. The dilution gas is admixed in the mixing section to provide proper inlet flow conditions for the second burner. For example, the hot gases are cooled to a predetermined temperature profile.

High local inlet temperatures may result in high emissions (e.g., NOx, CO, and unburned hydrocarbons) and/or flashback in the second burner. Flashback and NOx are induced by the reduced self-ignition time for the injected fuel due to a high inlet gas temperature or high oxygen concentration, which causes earlier ignition (leading to flashback) or reduced time for fuel air mixing resulting in local hot spots during combustion and consequently increases NOx emission. Low temperature regions can cause CO emissions, due to the increased self-ignition time. This can reduce the time for CO to CO2 burnout, and a reduced local flame temperature, which can further slowdown the CO to CO2 burnout. Finally local hot spots may lead to overheating of certain parts downstream of the mixer.

An exemplary sequential combustor arrangement according to the disclosure includes a first burner, a first combustion chamber, a mixing device for admixing a dilution gas to the hot gases leaving the first combustion chamber during operation, a second burner, and a second combustion chamber arranged sequentially in a fluid flow connection, wherein the mixer is adapted to guide combustion gases in a hot gas flow path extending between the first combustion chamber and the second burner including a duct having an inlet at an upstream end adapted for connection to the first combustion chamber and an outlet at a downstream end adapted for connection to the second burner.

A local high oxygen concentration can have a similar effect as a local high temperature, e.g. fast reaction reducing the time for mixing, high combustion temperatures, increased NOx emissions and possibly flash back. A local low oxygen concentration can have a similar effect as a local low temperature, e.g. slow reaction leading to increased CO and UHC (unburned hydrocarbon) emissions.

A high or low local inlet velocity can lead to increased or reduced residence time in the second burner and subsequent second combustion chamber, which has similar negative effects as inhomogeneous self-ignition times, e.g., a reduced residence time in the second burner can lead to incomplete mixing and high NOx. A reduced residence time in the second combustor can lead to incomplete combustion resulting in increased CO emissions. A reduced flow velocity in the second burner can lead to early ignition and flash back.

Further specifications from the aerodynamic point of view are minimised pressure loss in the hot gas path and the dilution gas supply. Both can impact the performance of a gas turbine operating with such a sequential combustor arrangement.

The mixer includes a plurality of injection tubes (also called injection pipe), which are pointing inwards from the walls of the duct for admixing the dilution gas to cool the hot flue gases leaving the first combustion chamber to provide appropriate inlet conditions to the second burner.

The diameter, length and number of these tubes are designed to admix dilution gas into the hot gas flow such that the specified local mass flow and temperature drop are achieved with a low pressure drop. Under most conditions, the injection tubes allow admixing of dilution gas with a pressure drop of 0.4% to 2% of the total pressure of the dilution gas pressure before admixing. With a low pressure drop at the inlet of the injector tubes, a pressure drop of 0.2% to 1% of the total pressure of the dilution gas pressure before admixing can be sufficient. To reduce the inlet pressure drop rounded tube inlets can be used.

According to an exemplary embodiment, the sequential combustor arrangement includes at least three groups of injection tubes pointing inwards from the side walls of the mixer for admixing the dilution gas to cool the hot flue gases leaving the first combustion chamber. The injection tubes of each group are arranged circumferentially distributed along the side wall of the mixer and wherein the first injection tubes of the first group have a first protrusion depth into the hot gas flow path, the second injection tubes of the second group have a protrusion depth, and the third injection tubes of the third group have a third protrusion depth.

For tubes arranged normal to the side wall the length of the tubes extending into the hot gas path is equal to the protrusion depth.

According to another exemplary embodiment of the sequential combustor arrangement, the distance in flow direction between the center point of first injection tube and center point of the second injection tube is between 0.1 and 2 times the diameter of the first injection tube.

According to yet another exemplary embodiment, the distance in flow direction between the center point of second injection tube and center point of the third injection tube is between 0.1 and 2 times the diameter of the second injection tube.

Under most conditions, the injection tubes of two neighboring groups are not arranged directly downstream of each other but offset in circumferential direction, thus a distance in axial direction of less than the diameter of the injection tubes is possible.

According to an exemplary embodiment of the sequential combustor arrangement, the duct wall is at least partly effusion cooled. Due to admixing of dilution gas the average temperature of the hot gas in the mixer is reduced downstream of the injection tubes. Under these conditions, a reduced cooling requirement and less diffusion cooling can be expected. However, due to locally increased turbulence the heat load on the side wall downstream of an injection tube can be increased. Therefore, in first effusion cooled regions downstream of each first injection tube and upstream of an array of subsequent third injection tube the number of effusion cooling holes per unit area can be increased. It is for example at least 30% bigger than the number of effusion cooling holes per unit area in a second region extending upstream of the first injection tube. Under most conditions, the second region extends for one to three diameters of the first injection tube upstream of the first injection tube.

Downstream of the last injection tube the hot gas temperature can be reduced to a level where no diffusion cooling is specified or other cooling methods are applied. Thus, a third region without effusion cooling can be arranged towards the exit of the mixer.

According to another exemplary embodiment, the first effusion cooled region has a trapezoidal shape with bases normal to the main flow direction of the hot gases, and wherein the downstream base of the trapezoidal first region is longer than the upstream base of the trapezoidal first region.

The length of the upstream base of the trapezoidal first region can for example be in the order of 1 to 2 times the diameter of the first injection tube.

The first region can for example have the shape of an isosceles trapezoid.

In a further exemplary embodiment the effusion cooling holes have a diameter in a range from 0.5 to 1.2 mm. Further the distance between neighboring effusion cooling holes is in a range from 3 to 10 mm in the first region and in a range from 6 to 20 mm in the second region.

According to one embodiment of the sequential combustor arrangement the first injection tubes can be arranged upstream of the second injection tubes, and upstream of the third injection tubes. Further, the third injection tubes can be arranged downstream of the second injection tubes.

Such an arrangement allows the injection of dilution gas to different regions of the mixer with minimum interference between the dilution gas injected by different injection tubes.

According to an yet another exemplary embodiment of the sequential combustor arrangement, the third injection tubes are arranged upstream of the second injection tubes, and upstream of the first injection tubes. Further, the first injection tubes can be arranged downstream of the second injection tubes. In an exemplary arrangement where the shorter injection tubes are upstream of the longer injection tubes first the dilution gas injected by the short injection tubes reduces the heat load of the subsequent longer injection tubes. For example, if the long injection tubes are in the flow path of the dilution gas of an upstream injection tube the long injection tube is cooled due to a cool shower effect.

According to one embodiment of the sequential combustor arrangement the diameter of the first injection tube is larger than the diameter of the second injection tube. Further, in combination or as an alternative arrangement the diameter of the second injection tube can be larger than the diameter of the third injection tube.

In yet another exemplary embodiment of the sequential combustor arrangement, the first injection tubes are arranged circumferentially distributed along the side wall of the mixer in a plane normal to the main flow direction of the hot gases flowing through the mixer, and the second injection tubes are arranged circumferentially distributed along the side wall of the mixer in one plane normal to the main flow direction of the hot gases flowing through the mixer.

Further, in one example, the number of second injection tubes can be equal to the number of first injection tubes. The second injection tubes can be arranged downstream or upstream of the first injection tubes wherein in radial direction they are in the center between two first injection tubes.

In a further exemplary embodiment, the third injection tubes are arranged circumferentially distributed along the side wall of the mixer and staggered relative to a plane which is normal to the main flow direction of the hot gases flowing through the mixer. The stagger of the injection tubes reduces flow blockage due to the injection tubes. The stagger can for example be in a range of 0.1 to 3.5 times the diameter of the third injection tube.

The tubes of the mixer are exposed to the hot gases leaving the first combustion chamber. The tubes are inherently cooled by the dilution gas which is flowing through them. However, to increase life time of the tubes additional measures to reduce the temperature of the tubes can be applied.

Therefore, according to one exemplary embodiment of the sequential combustor arrangement at least part of the outer surface of the injection tubes is coated with TBC. Further, at least part of the inner surface of the side wall of the mixer can be coated with TBC to reduce the cooling constraints of the wall, and to thereby avoid cool peripheral regions in the hot gas flow leaving the mixer.

In one exemplary embodiment, the heat transfer coefficient on the inside of the tube is increased. For increased heat transfer cooling ribs and/or a pin field can be arranged on the inner surface of the injection tubes.

According to a further exemplary embodiment, the mixer additionally includes injection holes arranged along the side wall. The first, second and third injection tubes are arranged to admix dilution gas towards the central region of the hot gas flow path and the injection holes are arranged to admix dilution gas into the wall regions of the hot gas flow path.

In a further exemplary embodiment the injection tubes are inclined at an angle of less than 90° relative to the flow direction of the hot gases such that the dilution gas leaving the tubes have a flow component in the direction of the hot gas flow at the location of injection.

The injection tubes can be inclined at an angle such that the axial component of the dilution gas leaving the tubes is equal to or within +/−50% of the axial flow velocity of the hot gas flow at the location of injection.

Besides the sequential combustor arrangement a gas turbine including such a sequential combustor arrangement is subject of the present disclosure. Such a gas turbine includes at least a compressor, a sequential combustor arrangement with a first burner, a first combustion chamber, a mixing device for admixing a dilution gas to the hot gases leaving the first combustion chamber during operation, a second burner, and a second combustion chamber arranged sequentially in fluid flow connection, wherein the mixer is adapted to guide combustion gases in a hot gas flow path extending between the first combustion chamber and the second burner including a duct having an inlet at an upstream end adapted for connection to the first combustion chamber and an outlet at a downstream end adapted for connection to the second burner, and at least one turbine. The mixer includes at least three groups of injection tubes pointing inwards from the side walls of the mixer for admixing the dilution gas to cool the hot flue gases leaving the first combustion chamber during operation. The injection tubes of each group are arranged circumferentially distributed along the side wall of the mixer and wherein the first injection tubes of the first group have a first protrusion depth into the hot gas flow path, the second injection tubes of the second group have a second protrusion depth, and the third injection tubes of the third group have a third protrusion. The mixer is arranged such that the dilution gas is admixed during operation to cool the hot gases.

The number of injection tubes in a group with a small protrusion depth can be larger than the number of injection tubes in a group with a high protrusion depth, e.g. if the second protrusion depth is bigger than the third protrusion depth the number of third injection tubes can be bigger than the number of second injection tubes. The number of injection tubes can for example be chosen such that the distance between the exit openings of neighboring injection tubes in two groups are similar. Similar in this context can mean that the distance between exit openings in the group with larger penetration depth one to three times the distance between exit openings of injection tubes of the group with smaller penetration depth. The distance between exit openings can further be increased with the exit diameter of the injection tubes. For example it can be proportional to the exit diameter.

Besides the gas turbine a method for operating such a gas turbine is subject of the present disclosure. Dilution gas can be admixed to the hot gases in the mixer such that the hot gases are cooled. According to an exemplary embodiment dilution gas is admixed into different regions of the cross section of the mixer via the first, second and third injection tubes.

In another exemplary embodiment the first injection tubes are arranged to admix dilution gas towards the central region of the hot gas flow path.

Effusion cooling might be used to cool the combustor walls and/or side walls of the mixing section.

Downstream of the dilution air injection mixing between dilution air and hot gas can be enhanced by a contraction of the flow path.

Referring to a sequential combustion the combination of combustors can be disposed as follows:

Both, the first and second combustors are configured as sequential can-can architecture.

The first combustor is configured as an annular combustion chamber and the second combustor is configured as a can configuration.

The first combustor is configured as a can-architecture and the secondary combustor is configured as an annular combustion chamber.

Both, the first and second combustor are configured as annular combustion chambers.

FIG. 1a, 2a show a generic gas turbine using sequential combustion with a mixer for admixing dilution gas in accordance with an exemplary embodiment of the present disclosure.

FIGS. 1a and 2a show a gas turbine 100 with a sequential combustor arrangement 104 according to the disclosure. It comprises a compressor 103, a sequential combustor arrangement 104, and a turbine 105. The sequential combustor arrangement 104 comprises a first burner 112, a first combustion chamber 101, and a mixer 117 for admixing a dilution gas to the hot gases leaving the first combustion chamber 101 during operation. Downstream of the mixer 117 the sequential combustor arrangement 104 further includes a second burner 113, and a second combustion chamber 102. The first burner 112, first combustion chamber 101, mixer 117, second burner 113 and second combustion chamber 102 are arranged sequentially in a fluid flow connection. Fuel can be introduced into the first burner 112 via a first fuel injection 123, mixed with compressed air which is compressed in the compressor 103, and combusted in the first combustion chamber 101. Dilution gas is admixed in the subsequent mixer 117. Additional fuel can be introduced into the second burner via a second fuel injection 124, mixed with hot gases leaving the mixer 117, and combusted in the second combustion chamber 102. The hot gases leaving the second combustion chamber 102 are expanded in the subsequent turbine 105, performing work. The turbine 105 and compressor 103 are arranged on a shaft 106.

The remaining heat of the exhaust gas 107 leaving the turbine 105 can be further used in a heat recovery steam generator or boiler (not shown) for steam generation.

In the example shown here compressor exit gas is admixed as dilution gas. Under most conditions compressor exit gas is compressed ambient air. For gas turbines with flue gas recirculation (not shown) the compressor exit gas is a mixture of ambient air and recirculated flue gas.

In exemplary embodiments, the gas turbine system includes a generator (not shown) which is coupled to a shaft 106 of the gas turbine 100.

Two different exemplary embodiments of the mixer 117 are shown in FIGS. 1b and 2b as an enlarged section of the FIGS. 1a and 2b FIG. 2a shows a first example with a mixer including first injection tubes 114 with length of second injection tube l1, second injection tubes 115 with a length of second injection tube l2, and third injection tubes 116 with a length of second injection tube l3. The second injection tubes 115 are arranged downstream of the first injection tubes 114, and the third injection tubes 116 are arranged downstream of the second injection tubes 115. The length of the injection tubes is decreasing in flow direction. In this example compressed gas from the compressor plenum is guided along the combustor liner in a connection duct 111 as dilution gas 110. From the connection duct 111 the dilution gas 110 is injected into the mixer via the first injection tubes 114, second injection tubes 115, and third injection tubes. The mixer 117 has a cross section with a height.

The mixer can be arranged with an annular cross section. For an annular mixer the height is the difference between the diameter of an outer wall of the annular flow section and the inner wall of the annular flow section. For a mixer with a cylindrical cross section (can-like mixer arrangement) the height is the diameter of the cross section. The length l1, l2, and l3 of the first, second and third injection tubes 114, 115, 116 are chosen such that good mixing of injected dilution gas 110 with the hot gas leaving the first combustion chamber 101 is assured.

FIG. 2b shows a sequential combustor arrangement with a mixer with first, second, and third injection tubes in accordance with an exemplary embodiment of the present disclosure. FIG. 2b shows an example which is based on the example of FIG. 1b. In this example the dilution gas 110 is directly supplied to the first injection tubes 114, second injection tubes 115, and third injection tubes 116 from the compressor plenum (downstream of the compressor 103). The first injection tubes 114, and second injection tubes 115 are extending into the compressor plenum and therefore dilution gas 110 with a higher pressure and lower temperature (no temperature pick-up due to the cooling of the combustor before use as dilution gas) is available.

FIG. 3 shows an exemplary mixer section with first, second, and third injection tubes in accordance with an exemplary embodiment of the present disclosure. FIG. 3 shows an example of the mixer 117 of FIGS. 1b, 2b in detail. In this example the first injection tube 114 has a diameter of the first injection tube D1 which is bigger than the diameter of the second injection tube D2. Further, the second injection tube 115 has a diameter of the second injection tube D2 which is bigger than the diameter of the third injection tube D3. The second injection tube 115 is arranged downstream of the first injection tube 114 with a distance in flow direction a1 in the main flow direction of the hot gas 127. The third injection tube 116 is arranged downstream of the second injection tube 115 with a distance in flow direction a2.

Figure 4:
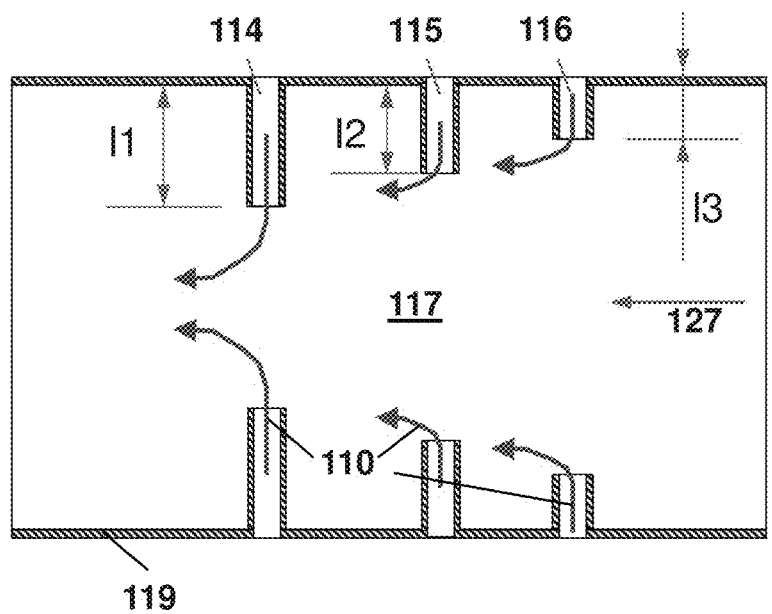
FIG. 4 shows a mixer section with first, second, and third injection tubes in accordance with an exemplary embodiment of the present disclosure.

FIG. 4 shows a mixer section with first, second, and third injection tubes in accordance with an exemplary embodiment of the present disclosure. FIG. 4 shows another example of a mixer 117. In this example, the second injection tube 115 is arranged downstream of the short third injection tube 116. The long first injection tube 114 is arranged downstream of the second injection tube 115. The dilution gas 110 injected from the third injection tube 116 at least partly cools the first and/or second injection tube 114, 115. The dilution gas 110 injected from the second injection tube 115 at least partly cools the first injection tube 114.

Figure 5:
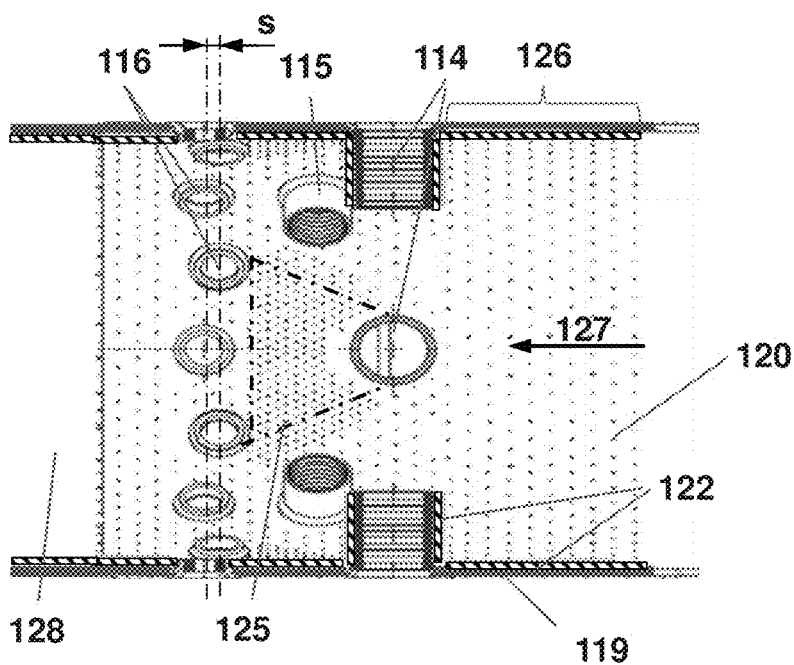
FIG. 5 shows a section of mixer in an annular architecture with diffusion cooling in accordance with an exemplary embodiment of the present disclosure.

FIG. 5 shows a section of mixer in an annular architecture with diffusion cooling in accordance with an exemplary embodiment of the present disclosure. For example, FIG. 5 shows an example of a section of mixer in a can architecture. It shows a cut-out of a cylindrical side wall 119. First, second, and 3 injection tubes 114, 115, 116 are arranged on the cylindrical side wall 119. The second injection tubes 115 are arranged downstream of the first injection tubes 114 in the main flow direction of the hot gas 127. A staggered array of third injection tubes 116 is arranged downstream of the second injection tubes 115. Neighbouring third injection tubes 116 are staggered by a stagger s in direction of the main flow direction of the hot gas 127 relative to a plane normal to the hot gas flow direction.

The inlet to the injection tubes 114, 115, 116 is rounded to reduce the pressure loss of the dilution gas entering the injection tubes 114, 115, 116.

The side wall 119 of the mixer is diffusion cooled. Diffusion cooling holes 120 are distributed over a large area of the side wall 119. A trapezoidal first region 125 downstream of each first injection tube 114. A homogeneously cooled second region 126 the wall extends upstream of the first injection tubes 114. The first region 125 has an increased density of diffusion cooling holes 120 relative to the second region 126. The first region 125 has the shape of an isosceles trapezoid. The shorter base extends in a direction normal to the main flow direction of the hot gases 127 in both directions from the centre of the first injection tube 114. The legs of the trapezoid can have an angle of about 30° to 45° relative to the main flow direction of the hot gases 127. In this example the first region 125 extends in the main flow direction of the hot gases 127 to the upstream side of subsequent third injection tubes 116.

Downstream of the third injection tubes 116 the hot gas temperature can be reduced to a level where no diffusion cooling is specified or other cooling methods are applied. A third region 128 without effusion cooling is shown arranged towards the exit of the mixer 117.

The inner surface of the side wall 119 is protected by thermal barrier coating 122. In addition the outer surface of the first injection tube 114 is protected by thermal barrier coating 122.

Figure 6:
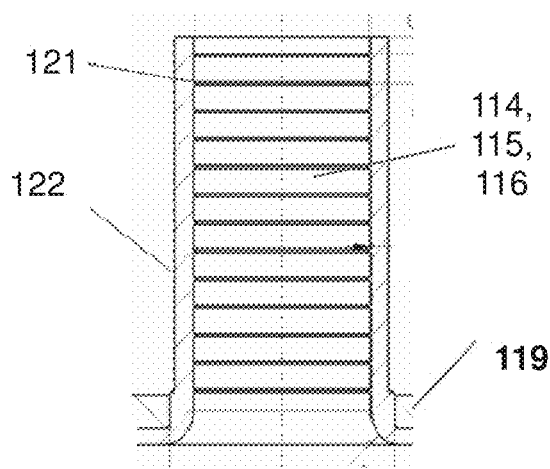
FIG. 6 shows an injection tube in accordance with an exemplary embodiment of the present disclosure.

FIG. 6 shows an injection tube in accordance with an exemplary embodiment of the present disclosure. For example, FIG. 6 shows an injection tube 114, 115, 116 attached to the side wall 119. The outer surface of the injection tube 114, 115, 116 is coated with thermal barrier coating 122 to reduce the heat transfer to the hot gas flow. Ribs 121 are applied on the inner surface of the injection tube 114, 115, 116 to increase the heat transfer for better cooling of the injection tube 114, 115, 116.

The first combustion chamber 101 and the second combustion chamber 102 can be arranged in a combustor can-can-architecture, e.g., the first combustion chamber 101 and second combustion chamber 102 are can combustion chambers.

The first combustion chamber 101 and the second combustion chamber 102 can be arranged in a combustor can-annular-architecture, e.g., the first combustion chamber 101 is arranged as an annular combustion chamber and second combustion chamber 102 is arranged as can combustion chamber.

The first combustion chamber 101 and the second combustion chamber 102 can be arranged in a combustor annular-can-architecture, e.g., the first combustion chamber 101 is arranged as can combustion chamber and second combustion chamber 102 is arranged as an annular combustion chamber.

The first combustion chamber 101 and the second combustion chamber 102 can be arranged in a combustor annular-annular-architecture, e.g., the first combustion chamber 101 and second combustion chamber 102 are annular combustion chambers.

The mixing quality of the mixer 117 is significant since the burner system of the second combustion chamber 102 specifies a prescribed inlet temperature and inlet velocity profile.

All the explained advantages are not limited just to the specified combinations but can also be used in other combinations or alone without departing from the scope of the disclosure. Other possibilities are optionally conceivable, for example, for deactivating individual burners or groups of burners. Further, the dilution gas can be re-cooled in a cooling air cooler before admixing in the mixer 117. Further the arrangement of the injection tubes or injection holes can be reversed, eg., the short second injection tubes or holes can be arranged upstream of the long first injection tubes. Further, there can be additional tube types with further tube length and tube diameter combinations.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS

100 Gas Turbine
101 First Combustor
102 Second Combustor
103 Compressor
104 Sequential combustor arrangement
105 Turbine
106 Shaft
107 Exhaust Gas
108 Compressed Air
109 Combustion Products
110 Dilution gas
111 Connecting Duct
112 First burner
113 Second burner
114 First injection tube
115 Second injection tube
116 Third injection tube
117 Mixer
118 Injection hole
119 Side wall
120 Effusion cooling holes
121 Rib
122 TBC
123 First fuel injection
124 Second fuel injection
125 First region
126 Second region
127 Main flow direction of the hot gases
128 Third region
a1 Distance in flow direction
a2 distance in flow direction l1 length of first injection tube
l2 length of second injection tube
l3 length of second injection tube
D1 diameter of first injection tube
D2 diameter of second injection tube
D3 diameter of third injection tube
s stagger

The invention claimed is:

1. A sequential combustor arrangement comprising:
a first burner, a first combustion chamber, a mixer for admixing a dilution gas to hot gases leaving the first combustion chamber during operation, a second burner, and a second combustion chamber arranged sequentially in a fluid flow connection, wherein the mixer is configured to guide combustion gases in a hot gas flow path extending between the first combustion chamber and the second burner with a duct having an inlet at an upstream end configured for connection to the first combustion chamber and an outlet at a downstream end configured for connection to the second burner;
wherein the mixer includes a first group of first injection tubes pointing inwards from side walls of the mixer for admixing the dilution gas to cool the hot gases when leaving the first combustion chamber, a second group of second injection tubes pointing inwards from the side walls of the mixer for admixing the dilution gas to cool the hot gases when leaving the first combustion chamber, and a third group of third injection tubes pointing inwards from the side walls of the mixer for admixing the dilution gas to cool the hot gases when leaving the first combustion chamber, wherein:
the first injection tubes of the first group are circumferentially distributed along the side walls of the mixer, the second injection tubes of the second group are circumferentially distributed along the side walls of the mixer, the third injection tubes of the third group are circumferentially distributed along the side walls of the mixer; and wherein the first injection tubes of the first group have a first protrusion depth into the hot gas flow path, the second injection tubes of the second group have a second protrusion depth into the hot gas flow path, and the third injection tubes of the third group have a third protrusion depth into the hot gas flow path; the second protrusion depth being bigger than the third protrusion depth and the second protrusion depth being smaller than the first protrusion depth;
the side walls of the mixer having diffusion cooling holes, at least some of the diffusion cooling holes positioned in a first region that has a trapezoidal shape, the first region extending in a main flow direction of the hot gases from adjacent at least one of the first injection tubes to a position adjacent at least one of the third injection tubes, the first region being positioned downstream of a second region that is homogenously cooled, the first region also being upstream of the third injection tubes, the first region also being located between immediately adjacent second injection tubes of the second injection tubes of the second group and downstream of the first injection tubes, the first region comprising a different hole spacing from a third region that is circumferentially adjacent to the trapezoidal shape.

2. The sequential combustor arrangement according to claim 1, wherein a distance in a the main flow direction between a center point of one of the first injection tubes and a center point of one of the second injection tubes is between 0.1 and 2 times a diameter of the one of the first injection tubes.

3. The sequential combustor arrangement according to claim 1, wherein a distance in the main flow direction between a center point of one of the second injection tubes and a center point of one of the third injection tubes is between 0.1 and 2 times a diameter of one of the second injection tubes.

4. The sequential combustor arrangement according to claim 1, wherein the mixer has a fourth region defined adjacent an exit of the mixer, the fourth region defined such that no diffusion holes are positioned in the fourth region.

5. The sequential combustor arrangement according to claim 1, wherein the trapezoidal shape of the first region has an upstream base adjacent the at least one of the third injection tubes, the upstream base extending in a direction that is normal to the a main flow direction for the hot gases and the trapezoidal shape of the first region has a downstream base that is longer than the an upstream base, the downstream base extending in the direction that is normal to the main flow direction for the hot gases.

6. The sequential combustor arrangement according to claim 5, wherein the upstream base has a length that is 1 to 2 times a diameter of one of the first injection tubes; and wherein a density of the diffusion holes in the first region is greater than a density of the diffusion holes in the second region.

7. The sequential combustor arrangement according to claim 5, wherein legs of the trapezoidal shape of the first region extend between the upstream base and the downstream base at an angle of between 30° and 45° relative to the main flow direction.

8. The sequential combustor arrangement according to claim 1, wherein a diameter of one of the first injection tubes is larger than a diameter of one of the second injection tubes, and/or the diameter of one of the second injection tubes is larger than a diameter of one of the third injection tubes.

9. The sequential combustor arrangement according to claim 1, wherein the first injection tubes are circumferentially distributed in a plane normal to the main flow direction for the hot gases when flowing through the mixer, and the second injection tubes are circumferentially distributed in a plane normal to the main flow direction of the hot gases flowing through the mixer.

10. The sequential combustor arrangement according to claim 1, wherein the third injection tubes are staggered relative to a plane normal to the main flow direction of the hot gases flowing through the mixer, wherein the stagger is between 0.1 and 3.5 times the diameter of one of the third injection tubes.

11. The sequential combustor arrangement according to claim 1, wherein at least part of an outer surface of the first injection tubes and/or at least part of an inner surface of the side walls of the mixer is coated with a thermal barrier coating.

12. The sequential combustor arrangement according to claim 1, wherein cooling ribs and/or a pin field is arranged on an inner surface of the first injection tubes.

13. A gas turbine comprising:
at least one compressor, a combustor, and at least one turbine, the combustor being a sequential combustor arrangement according to claim 1.

14. A method for operating a gas turbine having at least a compressor, and a sequential combustor arrangement including a first burner, a first combustion chamber, a mixer, a second burner, and a second combustion chamber arranged sequentially in a fluid flow connection, wherein the mixer is configured to guide combustion gases in a hot gas flow path extending between the first combustion chamber and the second burner with a duct having an inlet at an upstream end configured for connection to the first combustion chamber and an outlet at a downstream end configured for connection to the second burner, wherein the mixer includes a first group of first injection tubes pointing inwards from side walls of the mixer for admixing dilution gas to cool hot flue gases when leaving the first combustion chamber, a second group of second injection tubes pointing inwards from the side walls of the mixer for admixing the dilution gas to cool the hot flue gases when leaving the first combustion chamber, and a third group of third injection tubes pointing inwards from the side walls of the mixer for admixing the dilution gas to cool the hot flue gases when leaving the first combustion chamber, wherein:

the first injection tubes of the first group are distributed along the side walls of the mixer, the second injection tubes of the second group are distributed along the side walls of the mixer, the third injection tubes of the third group are distributed along the side walls of the mixer; and wherein the first injection tubes of the first group have a first protrusion depth into the hot gas flow path, the second injection tubes of the second group have a second protrusion depth into the hot gas flow path, and the third injection tubes of the third group have a third protrusion depth into the hot gas flow path; the second protrusion depth being bigger than the third protrusion depth and the second protrusion depth being smaller than the first protrusion depth, and the side walls of the mixer having diffusion cooling holes, at least some of the diffusion cooling holes positioned in a first region that has a trapezoidal shape, the first region extending in a main flow direction of the hot gases from adjacent at least one of the first injection tubes to a position adjacent at least one of the third injection tubes, the first region being positioned downstream of a second region that is homogenously cooled, the first region also being upstream of the third injection tubes, the first region also being located in a space between immediately adjacent second injection tubes of the second injection tubes of the second group and downstream of the first injection tubes, the first region comprising a different hole spacing from a third region that is circumferentially adjacent to the trapezoidal shape;

wherein the method comprising:

guiding, in the mixer, combustion gases in the hot gas flow path extending between the first combustion chamber and the second burner; and admixing, in the mixer, the dilution gas to the hot gases leaving the first combustion chamber, wherein the dilution gases are admixed via the first injection tubes, the second injection tubes, and the third injection tubes of the mixer to cool the hot flue gases leaving the first combustion chamber, and the dilution gases are admixed in different regions of a cross section of the mixer via the first injection tubes, the second injection tubes, and the third injection tubes.

15. The method of claim 14, wherein the first injection tubes are arranged upstream of the second injection tubes.

16. The method of claim 15, wherein the first injection tubes are arranged upstream of the third injection tubes; and the admixing of the diffusion gas occurs such that there is a pressure drop of 0.4% to 2% of a total pressure of the dilution gas pressure before admixing or a pressure drop of 0.2% to 1% of the total pressure of the dilution gas pressure before admixing.

17. The method of claim 14, wherein cooling ribs and/or a pin field is arranged on an inner surface of the first injection tubes.

18. The method of claim 14, wherein the first injection tubes have a first diameter, the second injection tubes have a second diameter, and the third injection tubes have a third diameter, the second diameter being smaller than the first diameter and the second diameter being larger than the third diameter.

19. The method of claim 14, wherein the third injection tubes are arranged such that the third injection tubes are staggered relative to a plane normal to the main flow direction of the hot gases flowing through the mixer; and the trapezoidal shape of the first region has an upstream base adjacent at least one of the third injection tubes, the upstream base extending in a direction that is normal to the main flow direction for the hot gases and the trapezoidal shape of the first region has a downstream base that is longer than the upstream base, the downstream base extending in the direction that is normal to the main flow direction for the hot gases adjacent some of the first injection tubes, the upstream base having a length that is 1 to 2 times a diameter of one of the first injection tubes, legs of the trapezoidal shape of the first region extending between the upstream base and the downstream base at an angle of between 30° and 45° relative to the main flow direction.

* * * * *